(2)
L. STEBBINS.
Machine for Coloring Maps, Prints, &c.
No. 79. A. I. Patented June 16, 1846.
Improvement of Pat. No. 1510
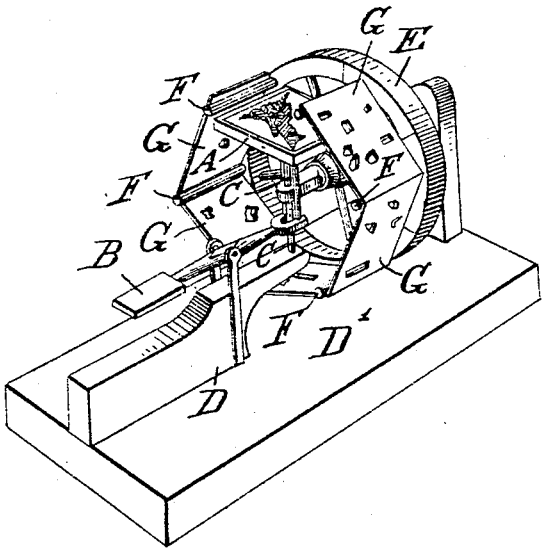
THE NORRIS PETERS CO., PHOTO-LITHO., WASHINGTON, D. C.